(12) United States Patent
Yona et al.

(10) Patent No.: US 11,140,178 B1
(45) Date of Patent: Oct. 5, 2021

(54) METHODS AND SYSTEM FOR CLIENT SIDE ANALYSIS OF RESPONSES FOR SERVER PURPOSES

(75) Inventors: Shlomo Yona, Tel Aviv (IL); Ron Talmor, Cupertino, CA (US)

(73) Assignee: F5 Networks, Inc., Seattle, WA (US)

( * ) Notice: Subject to any disclaimer, the term of this patent is extended or adjusted under 35 U.S.C. 154(b) by 18 days.

(21) Appl. No.: 12/883,696

(22) Filed: Sep. 16, 2010

Related U.S. Application Data

(60) Provisional application No. 61/263,778, filed on Nov. 23, 2009.

(51) Int. Cl.
*H04L 29/06* (2006.01)
*H04L 29/08* (2006.01)

(52) U.S. Cl.
CPC ...... *H04L 63/1408* (2013.01); *H04L 63/1416* (2013.01); *H04L 67/02* (2013.01); *H04L 29/08981* (2013.01)

(58) Field of Classification Search
CPC ............... H04L 29/08072; H04L 29/06; H04L 29/0809; H04L 29/08981; H04L 63/1408; H04L 67/02; H04L 63/1425; H04L 63/1416; G06Q 30/02
See application file for complete search history.

(56) References Cited

U.S. PATENT DOCUMENTS

| | | | |
|---|---|---|---|
| 6,311,278 B1 * | 10/2001 | Raanan et al. | 726/14 |
| 6,330,574 B1 | 12/2001 | Murashita | |
| 6,363,056 B1 | 3/2002 | Beigi et al. | |
| 6,505,242 B2 | 1/2003 | Holland et al. | |
| 6,883,137 B1 | 4/2005 | Girardot et al. | |
| 6,886,132 B1 | 4/2005 | Hall et al. | |
| 6,970,924 B1 | 11/2005 | Chu et al. | |
| 6,973,490 B1 | 12/2005 | Robertson et al. | |
| 6,990,074 B2 | 1/2006 | Wan et al. | |
| 7,003,564 B2 | 2/2006 | Greuel et al. | |
| 7,065,482 B2 | 6/2006 | Shorey et al. | |
| 7,080,314 B1 | 7/2006 | Garofalakis et al. | |
| 7,089,491 B2 | 8/2006 | Feinberg et al. | |
| 7,191,163 B2 | 3/2007 | Herrera et al. | |
| 7,197,639 B1 | 3/2007 | Juels et al. | |
| 7,292,541 B1 | 11/2007 | CS | |
| 7,296,061 B2 | 11/2007 | Martinez et al. | |
| 7,296,263 B1 | 11/2007 | Jacob | |
| 7,409,440 B1 | 8/2008 | Jacob | |
| 7,468,979 B2 | 12/2008 | Ricciulli | |
| 7,577,758 B2 | 8/2009 | Ricciulli | |

(Continued)

OTHER PUBLICATIONS

Cited dictionary definition.*

(Continued)

*Primary Examiner* — Joseph L Greene
(74) *Attorney, Agent, or Firm* — Troutman Pepper Hamilton Sanders LLP

(57) ABSTRACT

A method and system for collecting information on responses and their interpretation on a client device that requests access to a server. A request to access the server is received. If there was a response by the server for this request, then the response is being intercepted and is being injected with a client side language script to be executed by the requesting client side device. Information is collected at the server side from the execution of the injected client side language script by the client device.

24 Claims, 3 Drawing Sheets

(56) References Cited

U.S. PATENT DOCUMENTS

| | | | |
|---|---|---|---|
| 7,584,393 B2 | 9/2009 | Kamada et al. | |
| 7,710,867 B1 | 5/2010 | Masters | |
| 7,774,492 B2 | 8/2010 | Raphel et al. | |
| 7,860,815 B1 | 12/2010 | Tangirala | |
| 8,001,246 B2 | 8/2011 | Lu et al. | |
| 8,112,308 B1 | 2/2012 | Ho et al. | |
| 8,261,351 B1 | 9/2012 | Thornewell et al. | |
| 8,407,576 B1 | 3/2013 | Yin et al. | |
| 9,578,055 B1 | 2/2017 | Khanal | |
| 9,930,013 B2 | 3/2018 | Ossipov | |
| 2002/0087571 A1 | 7/2002 | Stapel et al. | |
| 2002/0087744 A1 | 7/2002 | Kitchin | |
| 2002/0099829 A1 | 7/2002 | Richards et al. | |
| 2002/0165954 A1* | 11/2002 | Eshghi | H04L 67/22 709/224 |
| 2002/0174216 A1 | 11/2002 | Shorey et al. | |
| 2003/0018450 A1 | 1/2003 | Carley | |
| 2003/0033369 A1 | 2/2003 | Bernhard | |
| 2003/0131052 A1* | 7/2003 | Allan | 709/203 |
| 2003/0191803 A1 | 10/2003 | Chinnici et al. | |
| 2003/0200289 A1 | 10/2003 | Kemp et al. | |
| 2003/0212954 A1 | 11/2003 | Patrudu | |
| 2003/0236995 A1 | 12/2003 | Fretwell, Jr. | |
| 2004/0006741 A1 | 1/2004 | Radja et al. | |
| 2004/0015783 A1 | 1/2004 | Lennon et al. | |
| 2004/0123277 A1 | 6/2004 | Schrader et al. | |
| 2004/0133605 A1 | 7/2004 | Chang et al. | |
| 2004/0138858 A1 | 7/2004 | Carley | |
| 2004/0143670 A1 | 7/2004 | Roychowdhury et al. | |
| 2004/0215665 A1 | 10/2004 | Edgar et al. | |
| 2004/0225656 A1 | 11/2004 | Sarkar | |
| 2005/0021736 A1* | 1/2005 | Carusi | H04L 43/00 709/224 |
| 2005/0028080 A1 | 2/2005 | Challenger et al. | |
| 2005/0160153 A1 | 7/2005 | Knutson et al. | |
| 2005/0246717 A1 | 11/2005 | Poole et al. | |
| 2006/0015846 A1 | 1/2006 | Fraleigh et al. | |
| 2006/0235976 A1 | 10/2006 | Chen et al. | |
| 2006/0277606 A1 | 12/2006 | Yunus et al. | |
| 2006/0282442 A1 | 12/2006 | Lennon et al. | |
| 2006/0291388 A1 | 12/2006 | Amdahl | |
| 2007/0011605 A1 | 1/2007 | Dumitru et al. | |
| 2007/0064610 A1 | 3/2007 | Khandani et al. | |
| 2007/0067839 A1 | 3/2007 | Hamada et al. | |
| 2007/0067841 A1 | 3/2007 | Yegneswaran et al. | |
| 2007/0150574 A1 | 6/2007 | Mallal et al. | |
| 2007/0266431 A1* | 11/2007 | Matsuda | H04L 63/0227 726/13 |
| 2007/0288247 A1* | 12/2007 | Mackay | G06Q 10/00 705/1.1 |
| 2008/0065653 A1 | 3/2008 | Shneur et al. | |
| 2008/0168150 A1 | 7/2008 | Chen et al. | |
| 2008/0212499 A1* | 9/2008 | Maes | H04M 3/567 370/265 |
| 2008/0228911 A1* | 9/2008 | Mackey | 709/224 |
| 2008/0271046 A1* | 10/2008 | Lipton | G06F 9/44521 719/311 |
| 2009/0037998 A1* | 2/2009 | Adhya et al. | 726/11 |
| 2009/0217386 A1 | 8/2009 | Schneider | |
| 2010/0031315 A1 | 5/2010 | Feng et al. | |
| 2010/0138809 A1 | 6/2010 | Shenfield et al. | |
| 2010/0218253 A1* | 8/2010 | Sutton | G06F 21/554 726/23 |
| 2010/0242092 A1* | 9/2010 | Harris | G06F 21/53 726/3 |
| 2010/0306827 A1* | 12/2010 | Esteve Balducci et al. | 726/4 |
| 2011/0099294 A1* | 4/2011 | Kapur | H04L 67/02 709/246 |
| 2012/0226802 A1 | 9/2012 | Wu et al. | |
| 2012/0331160 A1 | 12/2012 | Tremblay et al. | |
| 2014/0321462 A1 | 10/2014 | Kancherla | |
| 2014/0365680 A1 | 12/2014 | Van Bemmel | |
| 2015/0263959 A1 | 9/2015 | Patwardhan et al. | |
| 2015/0319270 A1 | 11/2015 | Roeland et al. | |
| 2016/0142373 A1 | 5/2016 | Ossipov | |

OTHER PUBLICATIONS

U.S. Appl. No. 12/018,031 entitled "DNS Flood Protection Platform for a Network," filed Jan. 22, 2008.

U.S. Appl. No. 10/444,279 entitled "System and Method for Managing Traffic to a Probe," filed May 23, 2003.

U.S. Appl. No. 12/357,372 entitled "Thwarting Drone-Waged Denial of Service Attacks on a Network," filed Jan. 21, 2009.

Amendment and Response to Office Action filed on Sep. 11, 2009 for U.S. Appl. No. 10/444,279.

Box et al.; Simple Object Access Protocol (SOAP); 1.1; May 8, 2000; pp. 1-34.

Levy, Ken; New XML Tools in Visual Studio 2005; Jul. 21, 2004; MSDN Blogs; p. 1.

Robot Wars—How Botnets Work, http://www.windowsecurity.com/articles/Robot-Wars-How-Botnets-Work.html, launched Oct. 20, 2005 (accessed Dec. 15, 2006), 10 pgs.

F5 Networks, Inc., "Application Firewalls", White Paper, Copyrighted Oct. 2007, 7 pgs.

"Ethereal—Interactively browse network traffic," www.ethereal.com/docs/man-pages/ethereal.1.html, (accessed Apr. 15, 2004).

"Tetheral—Dump and analyze network traffic," www.ethereal.com/docs/man-pages/tetheral.1.html, (accessed Apr. 15, 2004).

"Editcap—Edit and/or translate the format of capture files," www.ethereal.com/docs/man-pages/editcap.1.html, (accessed Apr. 15, 2004).

"Network Sniffer," www.linuxmigration.com/quickref/admin/ethereal.html, (accessed Apr. 15, 2004).

"FAQ: Network INtrusion Detection Systems," Version 0.8.3, Mar. 21, 2000, www.robertgraham.com/pubs/network-intrusion-detection.html.

Secure64 Software Corporation, "Surviving DNS DDoS Attacks: Introducing self-protecting servers," White Paper, Mar. 19, 2007 (18 pages).

"The-binary Advisory," The Honeynet Project, 4 pages, http//www.honeynet.org/reverse/results/sol/sol-17/advisory.html (accessed Feb. 20, 2008).

"Denial-of-service attack," Wikipedia, the free encyclopedia, 10 pages, http://en.wikipedia.org/w/index.php?title=Denial-of-service_attack&printables=yes (accessed Nov. 5, 2007).

F5 Networks Inc., "Optimize WAN and LAN Application Performance with TCP Express", F5 Networks Inc., White Paper, Aug. 2007, pp. 1-7, <www.f5.com>.

F5 Networks Inc., "Take Control of Multiple ISP Connections", F5 Networks Inc., BIG-IP Link Controller, Datasheet, Nov. 26, 2013, pp. 1-4, <www.f5.com>.

F5 Networks Inc., "Application Delivery with Programmable Infrastructure", F5 Networks Inc., BIG-IP Local Traffic Manager, Datasheet, Jul. 29, 2014, pp. 1-8, <www.f5.com>.

F5 Networks, Inc., "BIG-IP® Local Traffic Manager™: Implementations", Manual, May 24, 2016, pp. 1-232, 12.1, F5 Networks, Inc.

"Canonical Name Record (CNAME)," CNAME Record: Chapter 8, ZyTrax, Inc., 3 page, http://www.zytrax.com/books/dns/ch8/cname.html (accessed Feb. 20, 2008).

* cited by examiner

METHODS AND SYSTEM FOR CLIENT SIDE ANALYSIS OF RESPONSES FOR SERVER PURPOSES

CROSS-REFERENCE TO RELATED APPLICATIONS

This application claims priority to U.S. Patent Application No. 61/263,778, entitled "Methods And System For Client Side Analysis Of Requests For Server Purposes," filed on Nov. 23, 2009 by Talmor et al., the entire disclosure of which is incorporated herein by reference in its entirety.

TECHNOLOGICAL FIELD

This technology generally relates to network communication security, and more particularly, to returning requests with injected client side script language for execution by the client prior to passing the request to the server.

BACKGROUND

With the widespread use of web-based applications, and the Internet in general, concerns have been raised with the security of such servers and web applications operating on them in view of the array of potential malicious requests. Various security measures have been taken to combat these ever growing threats, including implementing web application firewalls ("WAFs"), such as the BIG-IP Application Security Manager™ ("ASM™") product developed by F5 Networks, Inc., of Seattle, Wash., which may be used to analyze network traffic to Web application servers for identifying and filtering out malicious packets or to otherwise thwart malicious attacks.

WAFs may employ various negative and/or positive security policies when evaluating network traffic passing through them. WAFs may encounter problems when evaluating JavaScript or other code intended to be executed in a particular context or environment or otherwise executed in an environment outside the WAF. For example, JavaScript code is often intended to be executed on the client side, and in order to be able to understand its dynamic nature, it would be evaluated within the context of the client, which would be difficult on a server-side WAF.

SUMMARY

According to one example, a method and system for collecting information on responses and their interpretation on a client device that requests access to a server. A request to access the server is received. If there was a response by the server for this request, then the response is being intercepted and is being injected with a client side language script to be executed by the requesting client side device. Information is collected at the server side from the execution of the injected client side language script by the client device.

In another example, a machine readable medium having stored thereon instructions for applying a client side language script to server requests for access to a server. The medium comprises machine executable code which when executed by at least one machine, causes the machine to receive a request including client side language script to access the server. The medium causes the machine to modify the intercepted response to that request and inject client side language script into the response for the code to be executed by the requesting client device. The medium also causes the machine to collect the information at the server side from the execution of the injected client side language script by the client device.

In another example, a network traffic manager for protection against attacks from a client device requesting access to a server. The network traffic manager comprises a server interface coupled to the server and a network interface coupled to the client device via a network. The network interface receives a request from the client device requesting access to the server. A controller is coupled to the server interface and the network interface. The controller is operative to receive a request to access the server, modify the response to this request with an injected client side language script to be executed by the requesting client device, return the response with the injected client side language script to the requesting client device and collect the information at the server side from the execution of the injected client side language script by the client device.

Additional aspects will be apparent to those of ordinary skill in the art in view of the detailed description of various embodiments, which is made with reference to the drawings, a brief description of which is provided below.

Figure 1:
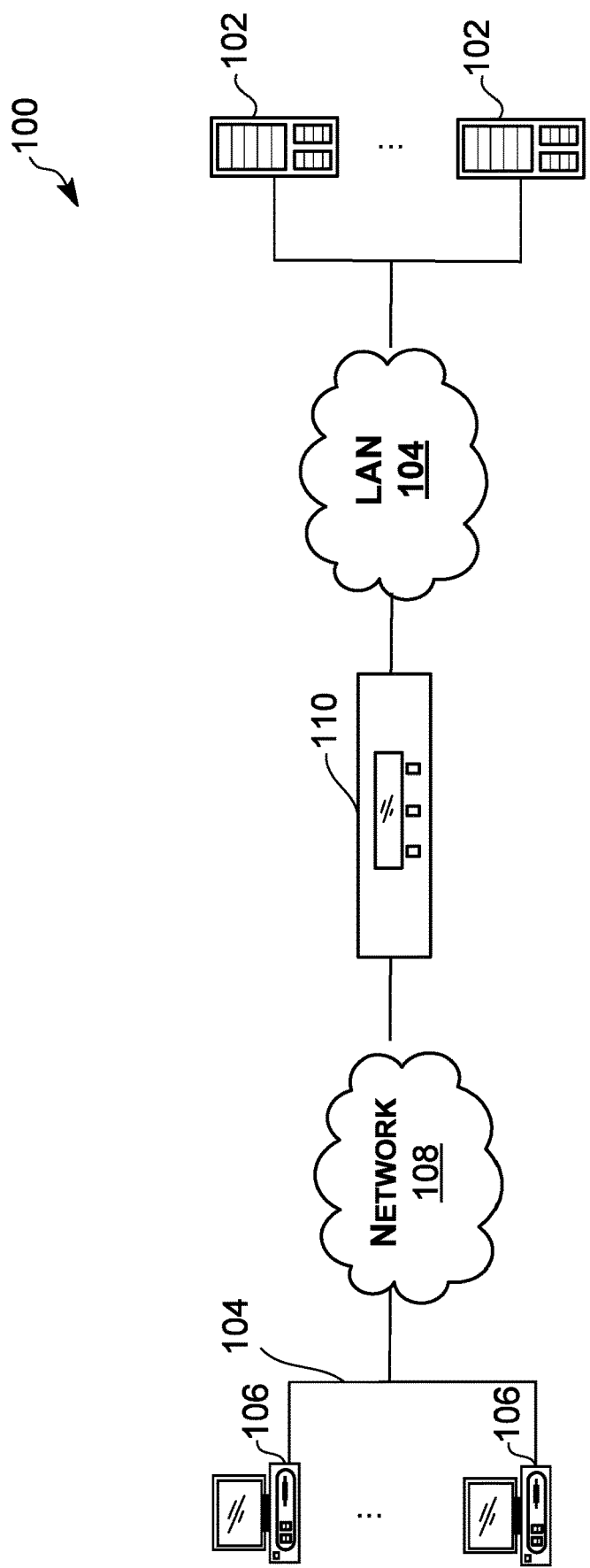
FIG. 1 is a diagram of an example system environment that includes a network traffic manager configured to identify and diffuse network attacks.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Positive security policies embody representations of what may be available and accessible to clients or other requestors accessing web applications in a network to be secured, including for example a list of a web application's allowed objects, methods, parameters, parameter values, etc., as well as their inter-relations, including what parameters and which values for these parameters are expected on which object using a particular method, for example. Such positive security policies may be generated or constructed for utilization by a WAF to implement a positive security policy when deployed in a network for a given web application. Every time a web application is updated or otherwise changed in some manner these positive security policies may likewise be updated or augmented to extend the security policy to cover the changed to the web application.

Techniques for automatically constructing and augmenting positive security policies are being implemented to cope with these issues, including extracting policy entities from server HTTP responses to client requests. Such policy extraction is often performed on static HTML script by parsing and analyzing the HTML content. In particular, the WAF attempts to statically analyze JavaScript code by extracting static strings and identify "policy entities" referenced by the code. These policy entities may be code objects and associated code object parameters.

However, when such HTTP content has JavaScript code embedded in it, extracting the policy entities becomes much more difficult and burdensome. This is due to the uncertainty involved in attempting to predict what the result or impact would be on the client device upon executing the JavaScript, whereby the context in which such code is executed materializes only on the client side.

In other words, WAFs that parse HTML code in HTTP responses cannot extract information that is available only when the JavaScript code executes on the client side. Such information includes, but is not limited to transformations resulting from actions or interactions with a webpage in a client browser. These actions or interactions can trigger other client side codes that ultimately interact with a server to cause other parts of the same or another webpage to be updated or changed (e.g. Ajax activity).

The below described systems and methods provide solutions to evaluate JavaScript or other code that is intended to be executed in an environment outside of the WAF. In particular, the systems and method employ a JavaScript Enabled Policy Entity Extraction (JSEPEE) technique which is used to extract and collect WAF policy entities on the client side regardless of whether the client is hostile or not.

Referring now to FIG. 1, an example system environment 100 employs a network traffic management device 110 that is capable of identifying and thwarting or diffusing these types of network attacks in an effective manner. The example system environment 100 includes one or more Web application servers 102, one or more client devices 106 and the traffic management device 110, although the environment 100 could include other numbers and types of devices in other arrangements. The network traffic management device 110 is coupled to the web application servers 102 via local area network (LAN) 104 and client devices 106 via network 108. Generally, requests sent over the network 108 from client devices 106 towards Web application servers 102 are received by traffic management device 110 as well as responses from Web application servers 102 that are returned back to client devices 106 over the network 108.

Client devices 106 comprise computing devices capable of connecting to other computing devices, such as network traffic management device 110 and Web application servers 102, over wired and/or wireless networks, such as network 108, to send and receive data, such as for Web-based requests, receiving responses to requests and/or for performing other tasks in accordance with the processes described below in connection with FIG. 3, for example. Non-limiting and non-exhausting examples of such devices include personal computers (e.g., desktops, laptops), mobile and/or smart phones and the like. In this example, client devices 106 run Web browsers that may provide an interface for operators, such as human users, to interact with for making requests for resources to different web server-based applications or Web pages via the network 108, although other server resources may be requested by clients. One or more Web-based applications may run on the web application server 102 that provide the requested response data back to one or more exterior network devices, such as client devices 106.

Network 108 comprises a publicly accessible network, such as the Internet in this example, which includes client devices 106, although the network 108 may comprise other types of private and public networks that include other devices. Communications, such as requests from clients 106 and responses from servers 102, take place over the network 108 according to standard network protocols, such as the HTTP and TCP/IP protocols in this example, but the principles discussed herein are not limited to this example and can include other protocols. Further, it should be appreciated that network 108 may include local area networks (LANs), wide area networks (WANs), direct connections and any combination thereof, and other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, Web application servers 102 and network traffic management device 110, and these examples are provided by way of example only.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108, and thus will not be described further.

Web application server 102 comprises one or more server computing machines capable of operating one or more Web-based applications that may be accessed by network devices, such as client devices 106, in the network 108, via the network traffic management device 110. The Web application server 102 may provide other data representing requested resources, such as particular Web page(s), image(s) of physical objects, and any other objects, responsive to the requests. It is contemplated that the Web application server 102 may additionally perform other tasks and provide other types of resources. It should be noted that while only two Web application servers 102 are shown in the environment 100 depicted in FIG. 1, other numbers and types of servers may be coupled to the network traffic management device 110. It is also contemplated that one or more of the Web application servers 102 may be a cluster of servers managed by the network traffic management device 110.

As per the TCP/IP protocols, requests from the requesting client devices 106 may be sent as one or more streams of data packets over network 108 to the network traffic management device 110 and/or the Web application servers 102 to establish connections, send and receive data over existing connections, and for other purposes. It is to be understood that the one or more Web application servers 102 may be hardware and/or software, and/or may represent a system with multiple servers that may include internal or external networks. In this example, the Web application servers 102 may be any version of Microsoft® IIS servers or Apache® servers, although other types of servers may be used. Further, additional servers may be coupled to the network 108 and many different types of applications may be available on servers coupled to the network 108.

Each of the Web application servers 102 and client devices 106 may include one or more central processing units (CPUs), one or more computer readable media (i.e., memory), and interface systems that are coupled together by internal buses or other links as are generally known to those of ordinary skill in the art; as such, they will not be described further.

As shown in the example environment 100 depicted in FIG. 1, the network traffic management device 110 is interposed between client devices 106 in network 108 and Web application servers 102 in LAN 104. Again, the environment 100 could be arranged in other manners with other numbers and types of devices. Also, the network traffic management device 110 is coupled to network 108 by one or more network communication links and intermediate network devices, such as routers, switches, gateways, hubs and other devices (not shown). It should be understood that the devices and the particular configuration shown in FIG. 1 are provided for exemplary purposes only and thus are not limiting.

Generally, the network traffic management device 110 manages network communications, which may include one or more client requests and server responses, from/to the network 108 between the client devices 106 and one or more of the Web application servers 102 in LAN 104 in these examples. These requests may be destined for one or more servers 102, and, as alluded to earlier, may take the form of one or more TCP/IP data packets originating from the network 108, passing through one or more intermediate network devices and/or intermediate networks, until ultimately reaching the traffic management device 110. In any case, the network traffic management device 110 may manage the network communications by performing several network traffic related functions involving the communications. For instance the network traffic management device 110 may manage the communications by load balancing, access control, and validating HTTP requests using client side code sent back to the requesting client devices 106 in accordance with the processes described further below in connection with FIG. 3. It is to be understood that although JavaScript is described herein, other client side script languages such as FLASH™, Silverlite™, VB Script™, and the like are contemplated and may be utilized by the system and method. It should also be noted that although HTTP responses are discussed herein with respect to the novel system and method, the responses may alternatively or additionally be implemented on top of other transport protocols.

Figure 2:
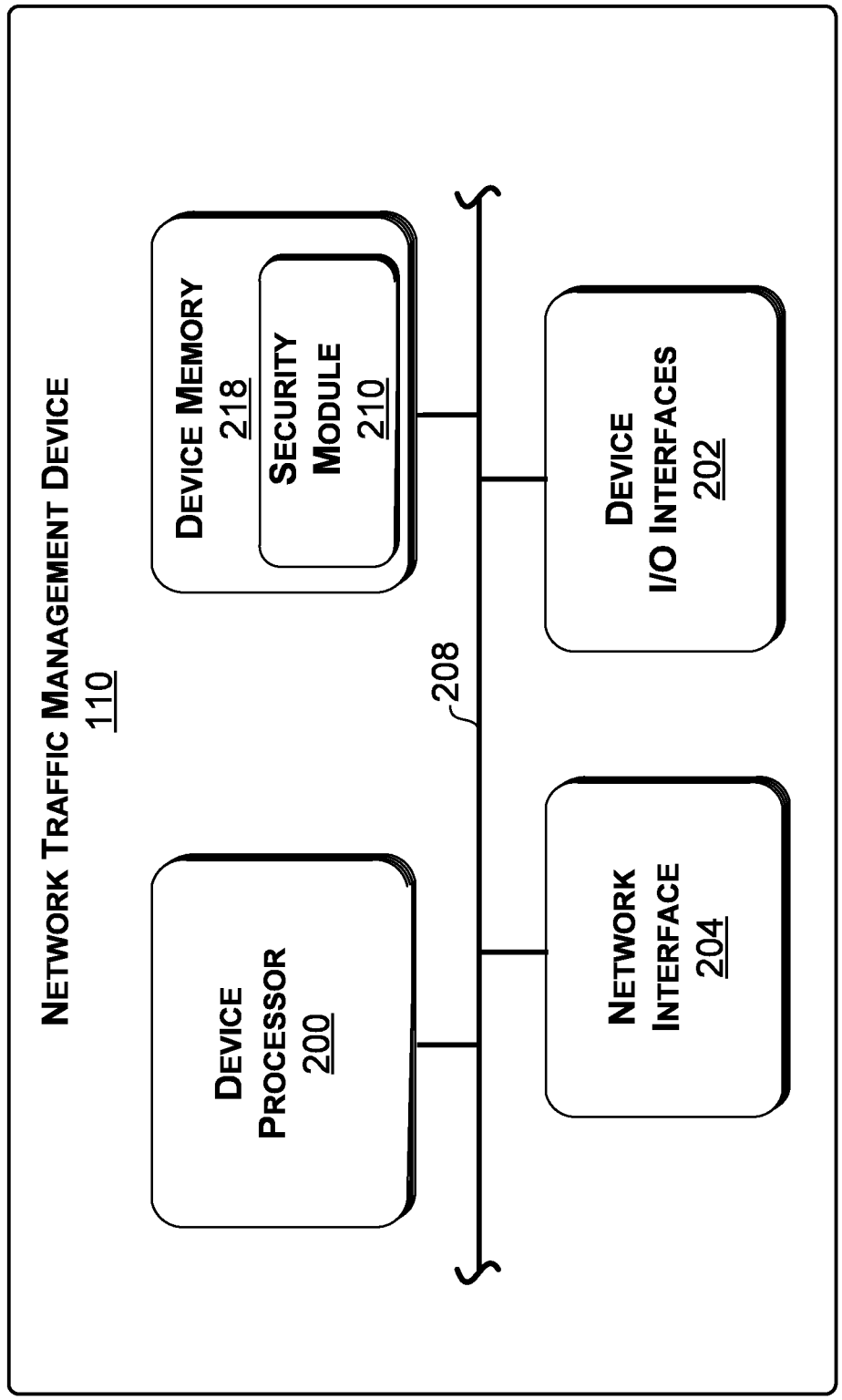
FIG. 2 is a block diagram of the network traffic manager shown in FIG. 1.

Referring now to FIG. 2, an example network traffic management device 110 includes a device processor 200, device I/O interfaces 202, network interface 204 and device memory 218, which are coupled together by bus 208, although the device 110 could include other types and numbers of components.

Device processor 200 comprises one or more microprocessors configured to execute computer/machine readable and executable instructions which are stored in device memory 218 to implement network traffic management related functions of the network traffic management device 110. In addition, the processor 200 implements security module 210 to perform one or more portions of the processes illustrated in FIG. 3 for protecting the system. It should be noted that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated herein with respect to FIG. 3.

Device I/O interfaces 202 comprise one or more user input and output device interface mechanisms, such as a computer keyboard, mouse, display device, and the corresponding physical ports and underlying supporting hardware and software to enable the network traffic management device 110 to communicate with the outside environment for accepting user data input and to provide user output, although other types and numbers of user input and output devices may be used. Alternatively or in addition, as will be described in connection with network interface 204 below, the network traffic management device 110 may communicate with the outside environment for certain types of operations (e.g., configuration) via a network management port, for example.

Network interface 204 comprises one or more mechanisms that enable network traffic management device 110 to engage in TCP/IP communications over LAN 104 and network 108, although the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. Where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as Web application servers 102. Moreover, the interface 204 may include certain physical ports dedicated to receiving and/or transmitting certain types of network data, such as device management related data for configuring the network traffic management device 110.

Bus 208 may comprise one or more internal device component communication buses, links, bridges and supporting components, such as bus controllers and/or arbiters, which enable the various components of the network traffic management device 110, such as the processor 200, device I/O interfaces 202, network interface 204, and device memory 218, to communicate with one another. It should be noted that the bus may enable one or more components of the network traffic management device 110 to communicate with components in other devices as well. By way of example only, example buses include HyperTransport, PCI, PCI Express, InfiniBand, USB, Firewire, Serial ATA (SATA), SCSI, IDE and AGP buses, although other types and numbers of buses may be used and the particular types and arrangement of buses will depend on the particular configuration of the network traffic management device 110.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. The storage media may contain computer readable/machine-executable instructions, data structures, program modules, or other data, which may be obtained and/or executed by one or more processors, such as device processor 200, to perform certain actions. Such actions may include implementing an operating system for controlling the general operation of network traffic management device 110 to manage network traffic and implementing security module 210 to perform one or more portions of the process illustrated in FIG. 3, for example.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing or specially programmed device, such as network traffic management device 110.

Security module 210 is depicted in FIG. 2 as being within memory 218 for exemplary purposes only; it should be appreciated the module 210 may be alternatively located elsewhere. The JSEPEE utilized by the security module 210 is used to extract and to collect WAF policy entities on the client side regardless of whether the client is hostile or not. In the case that one or more client devices potentially or actually attack a server, the security module of the network traffic management device 110 identifies and diffuses the potential or suspected network attack on the server 102 by placing additional burdens on the suspected attacking client devices 106. In particular, the security module 210 uses information obtained by the security module 210 to analyze collected data to identify potential or actual network attacks. The obtained information may include the identity of the one or more client devices 106, client requests destined for one or more particular servers, and/or particular resources made available by the servers 102 that have been requested.

The security module 210 also uses additional information obtained by further analyzing collected data to identify latencies associated with particular servers, server applications or other server resources, page traversal rates, client device fingerprints and access statistics that the security module 210 may analyze to identify anomalies indicative to the module 210 that there may be an attack. The security module 210 also analyzes collected data to obtain information the security module 210 may use to identify particular servers and/or server applications and resources on particular servers, such as Web application server 102, being targeted in a network attacks, so the module 210 can appropriately handle the attack.

Although an example of the Web application server 102, network traffic device 110, and client devices 106 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

In addition, two or more computing systems or devices may be substituted for any one of the systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

A data structure may be used on the client side such as the client device 106 for collecting information on discovered policy entities and may avoid duplicate information. The collected information may be either sent back to the server 102 using a web communications such as Ajax or by hijacking the next outgoing request to the server 102 (either via Ajax or those triggered by clicking on links, buttons or submitting forms) and replacing the original request with a synthetic request to the web application on the server 102 with identification markers. The synthetic request may be a modified request with the addition of information from the client side execution of the JavaScript code. The identification markers may include a special cookie, a special header or a special URL in which the original request and the collected information from the data structure is packed into the synthetic request. When the synthetic request is received by the network traffic management device 110, the security module 210 may recognize the identification marker and strip off the collected data. The data may then be pipelined to a policy builder for the security module 210 to handle while the original request is processed by the server 102.

The injected JavaScript code may provide the client side view for policy management. This may allow the code to take advantage of browser specific interpretations of the web application. Further, policy entities may be identified that materialize or exist only on the client side context, and that cannot be identified or deduced from observing HTTP responses (and unless specifically sent explicitly as is to the web application server, cannot be deduced from requests either). Dynamically generated policy entities on the client side may be recognized on the client side where client side scripting functions and the proper context of the user exists. In many cases the generation or materialization of some dynamically generated policy entities may be due to user (on the client side) operations which cannot be monitored or taken into account when processing HTTP requests or HTTP responses on the server (or on the web application firewall) side. Also, the policy analysis may result in faster convergence of the security policy building for the security module 210 compared with request-only based policy building due to the ability to view all policy entities on the client side and not only those requests that actually are being sent to the web application server such as the server 102.

Thus, the security module 210 may allow JavaScript analysis in constructing a security policy and therefore avoid the server 102 statically analyzing JavaScript in requests from a client device 106 for policy building. The JavaScript code that the security module 210 injects into responses may, when executed on a client side device, hijack JavaScript execution events on the client device 106. It is contemplated that the injected JavaScript code may be used to traverse a symbol table so that executions that produce useful policy entities can be logged and thereby be later sent back to the server 102 for security policy building and augmentation purposes. In an aspect where the client device 106 had not initially sent all required context information to the server in the initial request, the injected JavaScript code in the server's response may contain code which causes the client device 106 to send the absent but required context information to the server 102. This may allow the server 102 to perform more exact JavaScript processing using existing server-based tools to reduce risk of exposing JavaScript processing knowledge/needs to unauthorized client devices.

The JavaScript code injected on the response to the request by the security module 210 may hijack events similarly to the client processing but may use them to serialize the client side context. Then this serialization may be sent back to the server side where the processing on the JavaScript code (which is part of the client context) is performed by the client device. This solution may facilitate not exposing how and what is done with the JavaScript code, which is something that could be exposed in the client side solution. Alternatively a JavaScript enabled browser may be used on the network traffic management device 110 that will execute the JavaScript code and extract the required policy entities (without actually sending anything anywhere).

Figure 3:
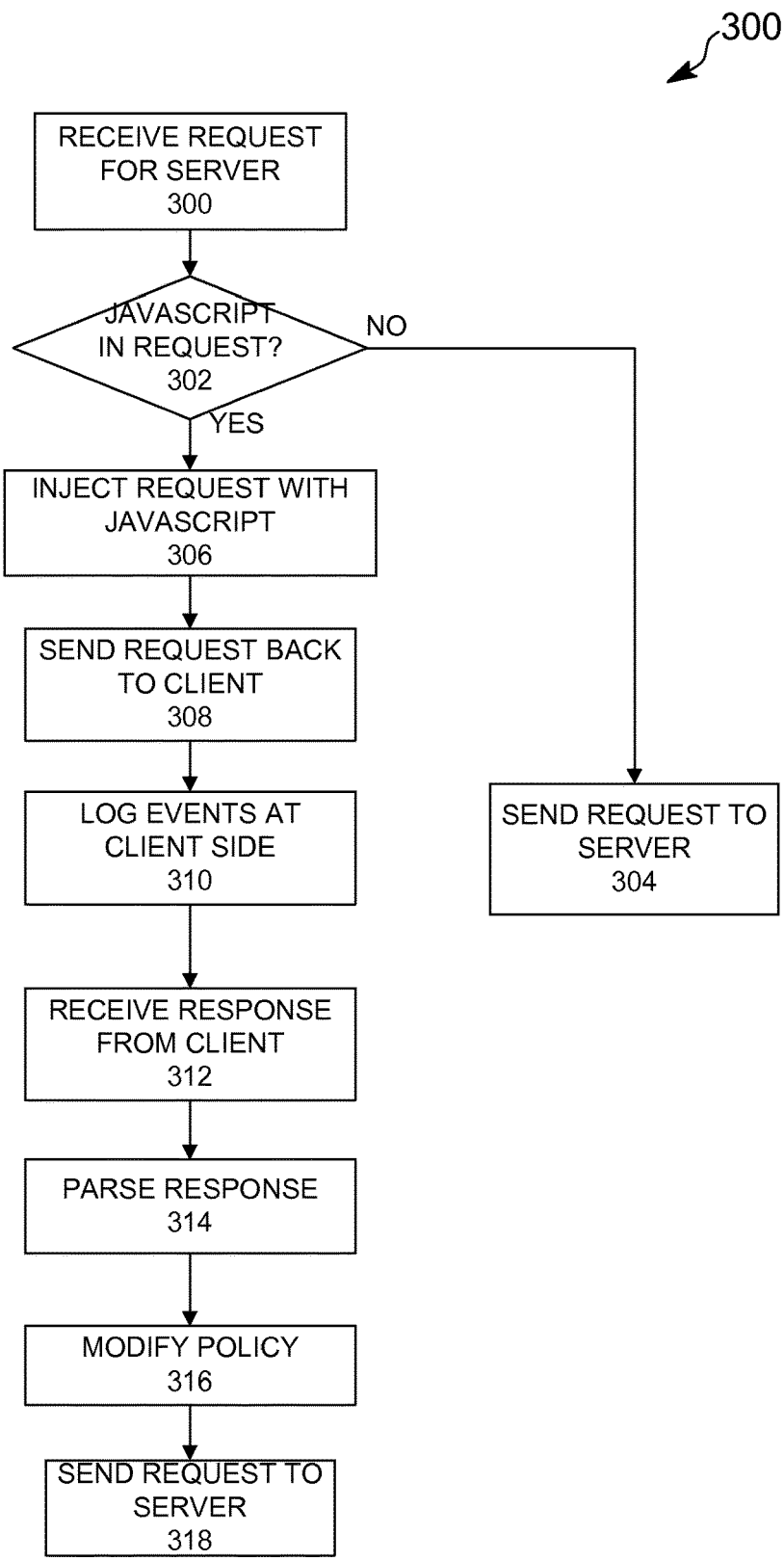
FIG. 3 is an example flow chart diagram depicting portions of processes for returning requests with client side JavaScript code to have the client device providing client information to augment policies for security.

The operation of the example use of JavaScript for a security policy is shown in FIG. 3 which may be run on the example network traffic management device 110, will now be described. FIG. 3 is an example flow chart diagram depicting portions of processes for returning requests with client side JavaScript code to have the client device providing client information to augment policies for security.

As shown in FIG. 3, a request from a client device 106 to one or more web application servers 102, is received by the network traffic management device 110 (300) and passed onto the web application server 102. Upon receiving the request, the network traffic management device 110 analyzes the request to determine whether the request has the appropriate merits (302). The merits may be based on the security module's 210 programmed security policy parameters.

If the security module 210 determines that the request does not have the requisite merits, then the security module 210 sends the request to the server without intercepting a subsequent response from the server 102 (304). However, if the security module 210 determines that the request has the requisite merits, then the security module 210 of the network traffic management device 100 will intercept the resulting response from the web application server 102 to that particular request (306). The security module 210 analyzes the server's response to determine whether predetermined conditions are met to inject the JSEPEE code into the server's response. Such predetermined conditions are preprogrammed into the network traffic management device 110 and are set for a particular desired application or scenario. In an example, the conditions are programmed such that the network traffic management device 110 analyzes the server's available resources, state of the policy building convergence, performance constraints, applicability of the of contents of the response for JSEPEE and the like.

In accordance with the process, upon the network traffic management device 110 determining that all conditions have been met, the security module 210 injects the JSEPEE code into the server's response which is then passed on back to the client device (308). The browser in the client device 106 thereafter executes the injected JSEPEE code while it processes the other contents of the server's response.

As stated above, the injected JavaScript code hooks onto events occurring on the device 106 and monitor these events to run traversals on the client side object model to monitor new or updated policy entities on the client device 102 and provide information regarding these policy entities (310).

Such events that the JavaScript code monitors include, but is not limited to page loads, page unloads, clicks, forms submittals and the like. In an aspect, the JavaScript code lists this information in a data structure which is then sent to the security module 210 of the network traffic management device 110 using Ajax or another appropriate means for further processing by a policy builder of the security module 210.

In the example in which Ajax is used to provide the information, the Ajax requests may contain serialization of the information that the network traffic management device's 110 policy builder is interested in. For example, the security module 210 generates a URL address and injects that address into the server's response along with the JSEPEE code. In the example, the information sent from the client device 106 is thereafter to that URL address, whereby only the network traffic management device 110, and not the server 102, is able to access that address and retrieve the sent information.

The network traffic management device 110 logs the potential policy entities from the subsequent request for sending the extracted policy entities to the security module 210 for the policy building purposes. The policies are then modified with the extracted policy entities by the policy builder on the security module 210 (316).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for network security policy building implemented by a network traffic management device interposed between a server system and a client system, the method comprising:
  determining when a predetermined condition is satisfied following receipt of a web response from a server that is responsive to an initial web request originated by a client, wherein the predetermined condition is based on performance of the server indicating a potential network security concern;
  attaching a client side language script to the web response to generate a modified web response, when the determination indicates the predetermined condition is satisfied, wherein the client side language script:
    is configured to be executed upon loading of the modified web response by the client, and
    comprises instructions configured to monitor a dynamic client event and to return client context information associated with a web application firewall policy entity impacted by the monitored dynamic client event in a subsequent web request, wherein the monitored dynamic client event is associated with a security policy for a web application associated with the web response;
  sending the modified web response to the client;
  receiving the subsequent web request from the client, wherein the subsequent web request comprises the client context information resulting from the execution of the client side language script of the modified web response to the initial web request originated by the client;

extracting the client context information from the subsequent web request; and modifying the security policy using the extracted client context information.

2. The method of claim 1, wherein the client side language script comprises additional instructions configured to traverse a symbol table on the client to extract the web application firewall policy entity.

3. The method of claim 1, further comprising extracting the web application firewall policy entity from the initial web request, subsequent web request, web response, modified web response, or client.

4. The method of claim 1, wherein the web application firewall policy entity is stored in a data structure on the client.

5. The method of claim 1, wherein the predetermined condition is further based on one or more of server resource availability, a state of a policy building convergence, a performance constraint, or applicability of the web response for the client side language script.

6. The method of claim 1, further comprising blocking access by the client to the web application when the web application is determined to be under attack based on the client context information.

7. The method of claim 1, further comprising:
determining whether the initial web request initiated by the client contains a requisite merit; and
intercepting the web response to determine whether the predetermined condition is satisfied based on the determination that the initial web request contains the requisite merit, wherein the web response is not intercepted when the initial web request does not contain the requisite merit.

8. The method of claim 1, wherein a dynamic client event comprises one or more of a page load, page unload, mouse click, web form submittal, or any other client or client browser interaction event.

9. A non-transitory machine readable medium having stored thereon instructions for network security policy building, comprising machine executable code which when executed by one or more processors of a network traffic management system interposed between a client system and a server system, causes the processors to:
determine when a predetermined condition is satisfied following receipt of a web response from a server that is responsive to an initial web request originated by a client, wherein the predetermined condition is based on performance of the server indicating a potential network security concern;
attach a client side language script to the web response to generate a modified web response, when the determination indicates the predetermined condition is satisfied, wherein the client side language script:
is configured to be executed upon loading of the modified web response by the client, and
comprises instructions configured to monitor a dynamic client event and to return client context information associated with a web application firewall policy entity impacted by the monitored dynamic client event in a subsequent web request, wherein the monitored dynamic client event is associated with a security policy for a web application associated with the web response;

send the modified web response to the client;
receive the subsequent web request from the client, wherein the subsequent web request comprises the client context information resulting from the execution of the client side language script of the modified web response to the initial web request originated by the client;
extract the client context information from the subsequent web request; and
modify the security policy using the extracted client context information.

10. The medium of claim 9, wherein the client side language script comprises additional instructions configured to traverse a symbol table on the client to extract the web application firewall policy entity.

11. The medium of claim 9, wherein the machine executable code, when executed by the processors, further causes the processors to extract the web application firewall policy entity from the initial web request, subsequent web request, web response, modified we response, or client.

12. The medium of claim 9, wherein the web application firewall policy entity is stored in a data structure on the client.

13. The medium of claim 9, wherein the predetermined condition is further based on one or more of server resource availability, a state of a policy building convergence, a performance constraint, or applicability of the web response for the client side language script.

14. The medium of claim 9, wherein the executable code, when executed by the processors, further causes the processors to block access by the client to the web application when the web application is determined to be under attack based on the client context information.

15. The medium of claim 9, wherein the executable code, when executed by the processors, further causes the processors to:
determine whether the initial web request initiated by the client contains a requisite merit; and
intercept the web response to determine whether the predetermined condition is satisfied based on the determination that the initial web request contains the requisite merit, wherein the web response is not intercepted when the initial web request does not contain the requisite merit.

16. The medium of claim 9, wherein a dynamic client event comprises one or more of a page load, page unload, mouse click, web form submittal, or any other client or client browser interaction event.

17. A network traffic management device interposed between a client system and a server system and comprising a memory comprising programmed instructions stored thereon and a processor configured to be capable of executing the stored programmed instructions to:
determine when a predetermined condition is satisfied following receipt of a web response from a server that is responsive to an initial web request originated by a client, wherein the predetermined condition is based on performance of the server indicating a potential network security concern;
attach a client side language script to the web response to generate a modified web response, when the determination indicates the predetermined condition is satisfied, wherein the client side language script:
is configured to be executed upon loading of the modified web response by the client, and
comprises instructions configured to monitor a dynamic client event and to return client context information associated with a web application firewall policy entity impacted by the monitored dynamic client event in a subsequent web request, wherein the monitored dynamic client event is associated with a security policy for a web application associated with the web response;

send the modified web response to the client;

receive the subsequent web request from the client, wherein the subsequent web request comprises the client context information resulting from the execution of the client side language script of the modified web response to the initial web request originated by the client;

extract the client context information from the subsequent web request; and modify the security policy using the extracted client context information.

18. The network traffic management device of claim 17, wherein the client side language script comprises additional instructions configured to traverse a symbol table on the client to extract the web application firewall policy entity.

19. The network traffic management device of claim 17, wherein the processor is further configured to be capable of executing the stored programmed instructions to extract the web application firewall policy entity from the initial web request, subsequent web request, web response, modified we response, or client.

20. The network traffic management device of claim 17, wherein the web application firewall policy entity is stored in a data structure on the client.

21. The network traffic management device of claim 17, wherein the predetermined condition is further based on one or more of server resource availability, a state of a policy building convergence, a performance constraint, or applicability of the web response for the client side language script.

22. The network traffic management device of claim 17, wherein the processor is further configured to be capable of executing the stored programmed instructions to block access by the client to the web application when the web application is determined to be under attack based on the client context information.

23. The network traffic management device of claim 17, wherein the processor is further configured to be capable of executing the stored programmed instructions to:

determine whether the initial web request initiated by the client contains a requisite merit; and intercept the web response to determine whether the predetermined condition is satisfied based on the determination that the initial web request contains the requisite merit, wherein the web response is not intercepted when the initial web request does not contain the requisite merit.

24. The network traffic management device of claim 17, wherein a dynamic client event comprises one or more of a page load, page unload, mouse click, web form submittal, or any other client or client browser interaction event.

* * * * *